Dec. 29, 1959     R. T. PRING     2,919,174
METHOD FOR REMOVAL OF HALIDES FROM GASES
Filed Sept. 12, 1956
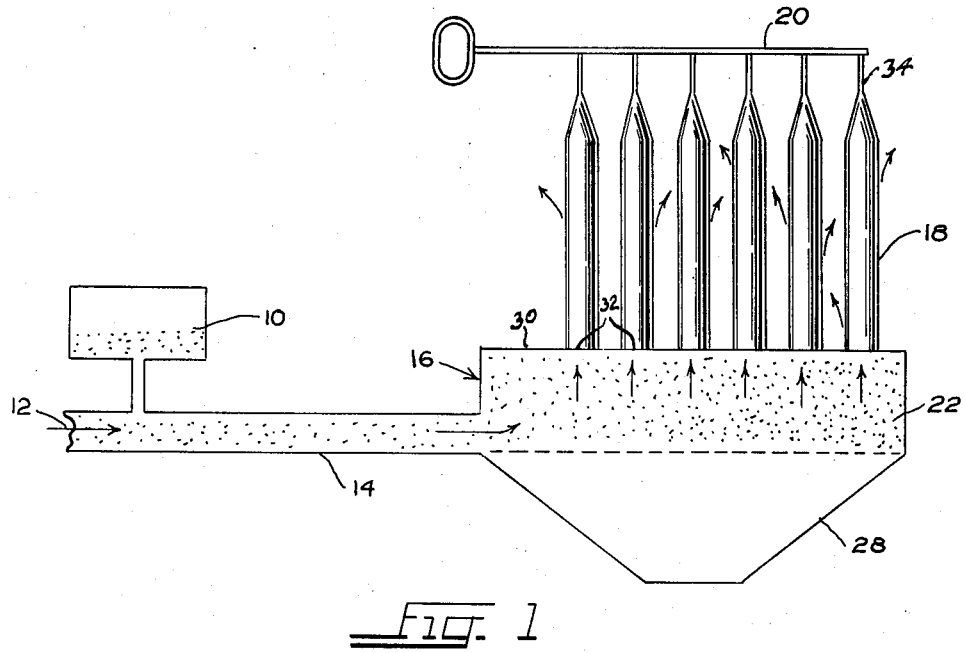
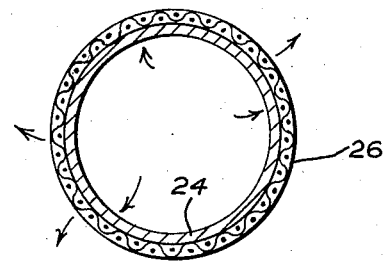
INVENTOR.
ROBERT T. PRING
BY
Attorney United States Patent Office 2,919,174
Patented Dec. 29, 1959

2,919,174

METHOD FOR REMOVAL OF HALIDES FROM GASES

Robert T. Pring, South Bend, Ind., assignor to Wheelabrator Corporation, Mishawaka, Ind., a corporation of Nebraska Application September 12, 1956, Serial No. 609,451

8 Claims. (Cl. 23—2)

This invention relates to the removal of fluoride gases present as a contaminant in air and to the recovery of fluorides separated from other gaseous media. It relates more particularly to a method and apparatus for the economical and substantially complete separation of fluorides from air or other gaseous media even when present in very low concentrations therein.

Fluoride gases are released as products or as by-products from various phases in the process industry such, for example, as release of fluorides in the metallurgical process of recovering aluminum from its ores. The release of fluoride gases to the atmosphere represents an undesirable and uneconomical waste of a very important and expensive raw material. Further, its release to the atmosphere is undesirable from the air pollution standpoint because of the effect on growing and livestock.

It is an object of this invention to provide a method and apparatus for the efficient and substantially complete removal of fluorides from other gaseous media and it is a related object to provide a method and means for the removal and recovery of same.

More specifically, it is an object of this invention to provide a method and apparatus for the economical, safe and efficient removal of fluoride gases from air, even when present in low concentration, and to provide means for the recovery thereof and it is a related object to provide a method and apparatus of the type described which is relatively low cost, which can handle large volumes of air without the use of excessive pressures or excessive power requirements, which has flexibility in construction and operation for use in small or large installations, which can be operated without the expenditure of large amounts of labor and materials, and which makes available the fluoride in a system which can be easily and efficiently handled either for disposal or for recovery.

These and other objects and advantages of this invention will hereinafter appear and for purposes of illustration, but not of limitation, an embodiment of the invention is shown in the accompanying drawing in which—

Figure 1 is a pictorial flow sheet illustrating the practice of this invention, and Figure 2 is a cross-sectional view through one of the filter elements employed in the separation system.

The removal and recovery of fluorides from air or other gases presents problems somewhat unlike the problems existing in the recovery of other gases or fumes including the other halogen gases, such as the chlorides, bromides or iodides. This is because the fluorides will react with other dry solids as distinguished from the relative inactivity of the halogens and because of the extreme toxicity of the fluoride gases in very low concentrations.

Where glass lined equipment or earthenware containers and piping can be employed for use with the chlorides, bromides and iodides, such glass lined equipment and earthenware structures would be attacked by the hydrofluoric acids or the like solutions formed of the dissolved fluorides. Thus the use of a wet scrubber has been found to be somewhat impractical. This is in addition to the fact that wet scrubbers are less efficient in the removal of fluorides, especially when the fluorides are present in low concentrations in air and the acids formed by the fluorides upon solution in the scrubbing fluids would still present a problem of disposal, in many locations.

The use of towers packed with dry absorbent material for taking out the fluorides from gases passed therethrough is faced with many of the same difficulties confronting the employment of wet scrubbers especially from the standpoint of corrosion and the necessity to make use of materials capable of resisting corrosion. A dry scrubber, in the form of a packed tower, however, presents a lesser problem of disposal. The difficulty with the use of a packed tower resides further in the limitation of use for the treatment of relatively small volumes of air because of the high pressures that would otherwise be required to force the contaminated air through the packed column of absorbent material. Thus, because of the limited capacity and the large power requirements, packed towers are not practical or efficient for use in the removal of fluoride gases from air especially when the fluoride gases are present in low concentrations as a contaminant.

A further objectionable feature in the use of packed columns as a dry scrubber for the removal of fluorides resides in the inflexibility of the process and the inability to maintain a high level of efficiency, from the standpoint of removal. This is because the system is static since the absorbent operates at the same level of efficiency for extraction of the fluoride gases until such time as the absorbent becomes satisfied. This is identified in the trade as the "break-through" point. Break-through occurs more frequently with systems in which the gas is present in larger concentrations. When break-through occurs, the level of efficiency of the unit falls rapidly to the extent that it becomes necessary to repack the towers with a fresh load of absorbent.

This invention is addressed to a new and improved process for effecting substantially complete removal of fluorides from the air and the like gaseous media without the limitations characteristic of the processes heretofore employed from the standpoint of capacity, power, cost, labor, efficiency, or materials. In accordance with the practice of this invention, substantially complete removal of fluorides is achieved from air or gas by the combination of steps which includes the dispersion of calcium carbonate in finely divided form for admixture with the contaminated air followed by the passage of contaminated air, containing the dispersed particles of calcium carbonate, through a filter surface on which the particles of calcium carbonate are separated out of the air to form a permeable layer through which the oncoming contaminated air must pass before being exhausted to the atmosphere.

The calcium carbonate dispersed in finely divided form in the air provides a large amount of surface area per unit weight of a material capable of taking up the fluoride by reaction or by adsorption and the presence of the calcium carbonate, as a dispersed phase in the air, permits effective contact between the contaminated air and the calcium carbonate particles in a fluid system which is capable of being maintained without the use of excessive pressures or power and without limitation as to the capacity of the system or the materials in which the gaseous substances are housed. While a substantial proportion of the fluoride gases will be taken up by the calcium carbonate particles present as a dispersed phase in the contaminated air, it has been found that some fluoride gases remain in the air in which the particles are dispersed. It is believed that the chance contact between the dispersed phase and the air permits some of the air to remain out of reactive communication with calcium carbonate particles. The permeable layer of the finely divided particles of calcium carbonate which is constantly being built up on the filter surface through which the contaminated air is passed brings the air into intimate contacting relationship with a sufficient thickness of calcium carbonate to achieve effective contact for removal of gaseous fluorides remaining in the air.

The system described is not subject to the limitations of a packed tower or dry scrubber because the calcium carbonate building up on the surface of the filter is of a character which avoids the possibility of break-through. Thus the unit is capable of maximum efficiency constantly to remove fluorides from the air. The characteristics of the thin permeable layer of finely divided calcium carbonate particles built up on the surface of the filter provides very little resistance to gaseous flow whereby the pressure drop through the filter system is insignificant by comparison with the pressure drop that takes place when an equivalent amount of contaminated air is processed through a packed column of absorbent material. In a system embodying the practice of this invention, a pressure drop of 3 inches of water is experienced in the treatment of air as compared to a pressure drop of 20 inches of mercury secured in the treatment of air at an equivalent rate in a packed column.

The combination of steps described permits the removal of better than 95–99 percent of the contaminating fluorides from air or other gases as compared to a lesser removal by the use of the dispersion step alone followed by other means of separation of the dispersed particles from the contaminated air, as by means of an electrical precipitator on cyclone separator. The combination of steps described permits substantially complete removal of fluorides from air or other gaseous medium as compared to the less efficient removal of fluorides in a tower packed with an absorbent or reactant and removal is effected with less pressure drop and with less power requirements.

The mechanism of removal has not been fully determined. It may constitute a reaction between the acid gas and the basic particles of calcium carbonate or it may constitute an adsorption process or combinations of both. Whatever the reason, it is known that removal of substantially all of the fluorides present as a contaminant in the air is achieved independent of concentration although the greatest benefit from the process described, as compared to systems heretofore employed, resides in the treatment of air containing less than 1000 p.p.m. of fluoride. The large volume of air treated as compared to the low concentrations of fluoride make wet scrubbers and packed towers prohibitive from the standpoint of the cost of the equipment, the size of the equipment and the power requirements for treatment of such large volumes of air. These are in addition to the lesser efficiency of such equipment in the treatment of air contaminated with such low concentrations of fluorides even when present in concentrations as 50,000 p.p.m. by weight in the air and more.

In the practice of this invention, it is desirable to make use of calcium carbonate finely divided into particles capable of being retained as a dispersion in air without the necessity to make use of excessive turbulence for maintaining the uniform dispersion of the calcium carbonate particles. For this purpose, use can be made of calcium carbonate of less than 200 mesh, but it is preferred to make use of calcium carbonate reduced to less than 325 mesh.

The amount of calcium carbonate dispersed in the air bears a direct relationship with the amount of fluoride present as a contaminant in the air. For substantially complete removal of fluorides from air, it is desirable to make use of an amount of calcium carbonate not less than the theoretical amount required to react with the hydrofluoric acid equivalent of the fluoride in the air. It is preferred to make use of an amount of calcium carbonate two to four times the theoretical amount required to react with the equivalent of hydrofluoric acid. The upper limit of concentration is that which is practical to distribute in the air without causing too rapid buildup of the layer of calcium carbonate on the surface of the filter. Because of the finely divided character of the calcium carbonate, a highly permeable layer is formed on the filter surface through which the air can flow freely without excessive pressure drop. In general, it is preferred to operate with a thickness of about $\frac{1}{16}$ to $\frac{1}{2}$ inch of calcium carbonate formed as a layer on the filter surface. Because the amount of calcium carbonate introduced into the air or other gas is more than enough to satisfy the gaseous fluorides in the air and because such carbonate is constantly being deposited to form a part of the built-up layer in the ratio described with respect to the fluorides, a layer which is permeable in character is formed and which is always capable of extracting fluoride from the system to the end that a break-through point, characteristic of packed towers, will not ordinarily be reached.

Instead of calcium carbonate, excellent use can be made of alumina, activated alumina, magnesia, slaked lime, burnt lime, other basic salts of alkali and alkali earth metals and other dry particulate substances capable of reacting with acids. Characteristic of these materials is their ability when dry to reaction with acids. These materials can be used in place of calcium carbonate in the amounts corresponding to the conditions previously described.

Referring now to the pictorial representation in the form of a flow sheet for the process and apparatus, the numeral 14 represents ductwork through which the contaminated gas 12 is conducted to a filtration device identified by the numeral 16. The particulate substance 10 is introduced in the desired ratio into the ductwork 14 at a distance in advance of the filter device for admixture with the contaminated air as a dispersion during remainder of travel with the air through the ductwork to the filter. The filter device should be formed with a filter surface through which the contaminated air is passed.

Use can be made of any conventional filter having characteristics of the type described but it is preferred to make use of a bag type filter having a high proportion of filter surface area, such as described in the issued Patents No. 2,137,254 and No. 2,143,664. The filter device illustrated by the numeral 16 is formed with an inlet plenum chamber 22 having an inlet at one end through which the contaminated air is introduced from the ductwork. The top wall 30 of the inlet plenum chamber is formed with a plurality of openings 32 in communication with the open ends at the bottom of a plurality of filter tubes 18. The tubes are closed at the top and suspended from hanger rods 34. The rods are adapted to be rocked for purposes of shaking the bags to loosen particulate substances collected as a layer 24 on the inner walls thereof. Suitable shaker mechanism, illustrated by the numeral 20, is provided therefor, as described in the aforementioned issued patents. Thus the collected material is removed from the walls when the thickness of the layer becomes excessive for most efficient operation. Agitation of the filter bag for removal is effected with the air flow cut off to permit the dry particulate substances collected as a layer 24 on the inner walls of the filter bags to fall gravitationally downwardly through the inlet plenum chamber 22 to a collecting hopper 28 therebelow where the particulate material is gathered for further processing in the event that it is desired to recover the fluoride or else for disposal, if economical use cannot be made of the residue. Recovery of the gaseous fluoride often becomes one of the important factors in separation, especially when it is appreciated that the fluorides have a present value of about $280.00 per ton. The filter tubes 18 can be formed of conventional textile filter material 26 since only a surface portion of the filter tubes come into contact with the particulate substance containing the fluorides. However, it is preferred to make use of tubes formed of high strength synthetic fibers of organic polymeric materials, since these materials are of higher strength than natural fibers and more resistant to the fluorides. In addition, they have a higher degree of thermal stability and can be used efficiently in the treatment of contaminated air at elevated temperatures.

The temperature of the air or other gaseous material treated is relatively unimportant except for the limitations which the temperature imposes upon the thermal break-down temperature of the material of which the filters are formed. The air passing through the filter surface will be relatively free of fluorides and thus can be passed in intimate contact with the fibers to filter elements for passage therethrough out into the atmosphere.

In an actual set of conditions for the removal of fluorides from air coming off of an aluminum reduction process, using cryolite ore, the air contained fluorides in the form of H₂F₂ and in the form of hydrofluorosilicic acid and the like. On the average, the contaminated air led into the filter bag housing contained about 200 p.p.m. of fluoride. Calcium carbonate (325 mesh) was introduced into the stream of contaminated air passing through the ductwork at a rate to provide about 2,000 p.p.m. by weight. The air issuing from the filter bag housing contained less than 10 p.p.m. of fluoride. This amounts to removal of more than 190 p.p.m. or better than 95 percent.

Calculated on the reaction

$$CaCO_3 + H_2F_2 \rightarrow CaF_2 + CO_2 + H_2O$$

100 parts of calcium carbonate reacts theoretically with 40 parts of $H_2F_2$ or the 192 parts of fluoride would have theoretically required about 500 parts by weight of calcium carbonate. Thus the amount of calcium carbonate used in the system described was about four times the theoretical. The bag house was operated on about a 30 minute cycle comprising a run of 25 minutes followed by a shake-down of about 5 minutes. While the bags were being shaken down, the air could either be shut off or else, in a preferred system, the air could be circulated through a second filter bag house employed in combination with the first for alternate use of the bag houses for operation on a continuous cycle. Often less than 30 seconds are required to shake down the bags before putting the unit back into the system.

It will be apparent from the foregoing that the process described is capable of continuous operation for the removal of fluoride gases from air or other gaseous medium without loss in efficiency of fluoride removal. Thus the system can be employed effectively in the process industries where fluoride gases are released in a unit operation where there is continuous demand for removal. The long cycle of operation of the filter bag house distinguishes the process of other systems for gaseous removal.

In an aluminum reduction process, it is preferred to make use of alumina or activated alumina as the particulate substance because the residue collected can be employed directly as a raw material in the reduction process for the recovery of aluminum and utilization of the fluoride.

Instead of making use of the residue as a raw material in a reduction process, the particulate substances can be otherwise treated or reacted to recover the fluoride as a product. Suitable processes for the recovery will depend somewhat upon the particulate substance employed and the character of the removal or adsorption. If the fluoride is adsorbed in the solids, recovery can be effected by heating to drive off the fluoride and to reactivate the particulate substance or use can be made of steam distillation for driving off the fluoride. If chemical reaction has taken place, suitable chemical treatment to recover the fluorides may be selected. In the event that recovery is not effected, the dry residue can be disposed of without much difficulty.

The present invention has convenient definable utility when applied to the removal of fluorides from air or other gaseous media because of the difficulties heretofore encountered in effecting fluoride removal. These same difficulties are not prevalent in the recovery of other halides, such as the chlorides, bromides and iodides, since none of these materials form solutions or products which react as avidly in the dry state. Notwithstanding these differences, the process and apparatus described can be used effectively and efficiently to remove and recover gaseous chlorides, bromides and iodides from air and it can also be used effectively to remove sulphur dioxide. In calculating for the amount of carbonate, limestone, burnt lime, slaked lime, alumina, activated aluminum oxide or magnesia, introduced into the contaminated air for extraction of the corresponding hydrogen chloride, hydrogen iodide, hydrogen bromide, or sulphur dioxide, the proportion heretofore described based upon theory for the system of calcium carbonate and fluorides may be employed.

It will be understood that the term air as used in the specification and claims is intended to be used interchangeably with other gaseous medium in which such gaseous contaminants are present in low or in high concentration and it will be further understood that other filter devices and filter media may be used in the practice of this invention and that other changes may be made in the details of construction and operation without departing from the spirit of the invention, especially as defined in the following claims.

I claim:

1. The method of removing gaseous fluorides from other gaseous systems comprising the steps of introducing a dry basic material having a basic reaction, in finely divided form for suspension into the fluoride contaminated gaseous medium, passing the contaminated gaseous medium with the particulate substance suspended therein through a filter surface having a permeable layer of the particulate substance built up on the ingoing side thereof whereby the particular substance suspended in the gaseous system separates out on the formed layer to add to the thickness thereof while the contaminated gaseous system continues to pass through the composite layer intimately to engage the dry basic material for separation of fluoride from the gaseous system and to hold the built-up layer onto the filter surface.

2. The method of removing fluoride gases present as a contaminant in air comprising the steps of introducing a dry basic material having a basic reaction in finely divided form for suspension into the contaminated air passing the contaminated air with the particulate substance suspended therein through a filter surface, permitting the particulate substance to separate out on the surface of the filter thereby to form a permeable layer of the particulate substance which functions as a medium through which the contaminated air must pass, and continuing to pass the contaminated air with the particulate substance suspended therein through the filter sections with the layer of particulate substance thereon intimately to engage the contaminated air with the particulate substance to remove fluorides therefrom and to hold the built-up layer onto the filter surface.

3. The method of removing gaseous fluorides from air comprising the steps of introducing a dry substance selected from the group consisting of limestone, calcium carbonate, slaked lime, burnt lime, alumina, activated alumina and magnesia into the contaminated air and in which the materials are reduced to a particle size for uniform suspension in the air whereby the dry particulate substances suspended in the air are capable of removal of fluorides from the air, passing the contaminated air with the particulate substance suspended therein through a filter surface having a permeable layer of the particulate substance built up thereon by filtration of particulate substance from the air passing therethrough whereby the particulate substance suspended in the air separates out on the formed layer to add to the thickness thereof while the contaminated air continues to pass through the composite layer intimately to engage the dry basic substances for separation of fluoride from the air and to hold the built-up layer onto the filter surface.

4. The method as claimed in claim 2 in which the dry particulate substance is dimensioned to have a particle size less than 200 mesh.

5. The method as claimed in claim 2 in which the dry particulate substance is introduced into the air in an amount not less than that theoretically required to react with the fluoride in the air when calculated as hydrogen fluoride.

6. The method as claimed in claim 3 in which the particulate substance is introduced into the air in an amount greater than twice the theoretical amount required to react with the fluoride in the air when calculated as hydrogen fluoride.

7. The method of removing halide gases present in low concentrations in other gaseous medium comprising the steps of introducing a dry substance selected from the group consisting of limestone, calcium carbonate, slaked lime, burnt lime, alumina, activated alumina and magnesia in finely divided form for suspension into the contaminated gaseous medium, passing the contaminated gaseous medium with the particulate substance suspended therein through a filter surface having a permeable layer of the particulate substance built up thereon by filtration of particulate substance from the gaseous medium passing therethrough whereby the particulate substance suspended in the gaseous medium separates out on the formed layer to add to the thickness thereof while the contaminated gaseous medium continues to pass through the composite layer intimately to engage the dry particulate substances for separation of halides from the air and to hold the built-up layer of particulate substance on the filter surface.

8. The method as claimed in claim 7 which includes the additional steps of stopping the flow of contaminated gaseous medium through the filter surface at intervals when the built-up layer of particulate substance on the filter surfaces offers increased resistance to gaseous flow therethrough to release the built-up layer, removing particulate substance from the built-up layer on the filter surface while said gaseous flow is stopped, adding additional amounts of particulate substance to the gaseous substance immediately to form another layer on the surface of the filter in subsequent flow.

References Cited in the file of this patent

UNITED STATES PATENTS

| | | |
|---|---|---|
| 1,221,505 | Bradley et al. | Apr. 3, 1917 |
| 2,137,254 | Turnbull | Nov. 22, 1938 |
| 2,573,704 | Gilbert et al. | Nov. 6, 1951 |
| 2,778,715 | Austin | Jan. 22, 1957 |

FOREIGN PATENTS

| | | |
|---|---|---|
| 752,803 | Great Britain | July 18, 1956 |